No. 687,386. Patented Nov. 26, 1901.
B. SCHWERIN.
PROCESS OF EXTRACTING SUGAR.
(Application filed May 25, 1901.)
(No Model.)
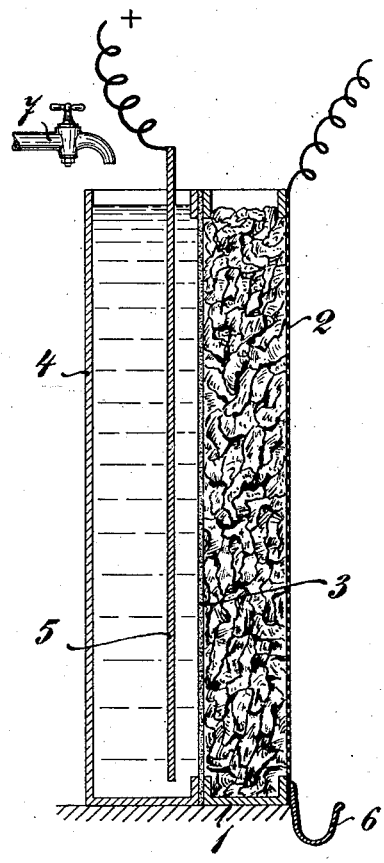
Witnesses:
Chas. R. VanHorn.
Osgood H. Powell
Inventor:
Botho Schwerin
By Julian A. Powell
His Atty.

UNITED STATES PATENT OFFICE.

BOTHO SCHWERIN, OF MUNICH, GERMANY.

PROCESS OF EXTRACTING SUGAR.

SPECIFICATION forming part of Letters Patent No. 687,386, dated November 26, 1901.

Application filed May 25, 1901. Serial No. 61,912. (No specimens.)

*To all whom it may concern:*

Be it known that I, BOTHO SCHWERIN, a subject of the King of Prussia, Emperor of Germany, residing at No. 6 Prinz Ludwigstrasse, Munich, Bavaria, German Empire, have invented a new and useful Process of Extracting Sugar; and I do hereby declare that the following is a full, clear, and exact description of the invention, which will enable others skilled in the art to which it appertains to make and use the same.

This invention relates to the art of extracting sugar from saccharine matter—such as beet-root, sugar-cane, sorghum, and the like—by the agency of the electric current; and it has for its object to so operate the electrical treatment that decomposition of sugar by inversion is avoided.

I have found that when saccharine material previously reduced to a suitable state of disintegration and inclosed in a wet state between walls which are pervious to liquid and of which one is used as the negative electrode is acted upon by the electric current, with the interposition of a layer of water between the material to be treated and the positive electrode, a liquor is caused to percolate through the negative electrode, which consists of a watery solution of saccharose and soluble albumen compounds and which proves to be perfectly free from organic and inorganic salts, as also from invert-sugar in case the material acted upon does not contain invert-sugar—as, for instance, pulp from normal beet-roots—whereas with such materials as contain invert-sugar—for instance, ground sugar-cane—the amount of invert-sugar present is not increased as far as the action of the current is concerned. From the liquor obtained the sugar and albumen compounds can easily be obtained separately by known processes. The result stated is due to the fact that the electric current exerts a double or compound action upon the dissolved or soluble compounds of the material—that is to say, those components which are dissociable by the action of the current are electrolytically decomposed, the cations accumulating at the negative electrode and the anions at the positive electrode in the water separating the same from the material, while those components which resist the decomposing action of the current— viz., the sugar, the soluble albumen compounds, and the water—are subject to what is called "electro-endosmosis"—that is to say, are driven to the negative electrode—so that by using a pervious electrode a watery sugar solution contaminated with albumen compounds is delivered to the outside.

The cations accumulate at the negative electrode principally in the form of dissolved hydroxids of the alkaline metals and of ammonium, which, as well known to those skilled in the art, have no inverting action upon cane-sugar, while the acid-forming ions or anions, which become inverting agents, accumulate at the positive electrode and remain separated from the material by the interposed body of water, whereby they are prevented from acting upon the sugar. Moreover, sugar withdraws the more and more from the positive electrode as the process goes on.

The present invention consists in inclosing the saccharine material in a state of suitable disintegration and mixed or thinned, if required or desirable, with more or less water between a body of water and an electrically-conductive wall pervious to liquid and connected with the negative pole of a source of electricity, driving the sugar and other non-dissociable dissolved constituents toward and through the negative electrode by passing the current through the material by means of a positive pole placed into the said body of water, collecting the liquor as it percolates through the negative electrode, and separating the sugar from said liquor in known manner.

The terms "disintegration" and "disintegrated" as used in this specification and its annexed claims are intended to express in a broad sense any sufficient degree of subdivision.

In practicing my invention I prefer to proceed as follows, reference being had to the annexed sheet of drawings, illustrating in a diagrammatical manner the apparatus used, the same being shown in a longitudinal section.

The saccharine material—for example, beet-root slices or strips—is filled in a vertically-disposed box 1, the rear wall of which is constructed of fine wire-gauze 2, while the other or front wall consists of filtering-cloth 3, both walls being suitably fixed to a wooden frame of rectangular shape and open at the top. To the filter-clothed side of the frame is adapted, so as to obtain a water-tight joint, a box 4, of suitable non-conducting material, preferably wood, which box is open at top and toward the filtering-cloth. This box is then filled with water and the positive electrode 5 placed in the water. This electrode is preferably a soluble metal electrode—for instance, iron, zinc, or aluminium—for the purpose of binding the acid anions with formation of insoluble salts. The wire-gauze wall 2, which is preferably made out of copper, is connected with the negative pole of the source of electricity (not shown)—for instance, a dynamo. When the circuit is closed, liquor begins to percolate through and run down at the outside of the negative electrode and is collected at the lower end in a vessel placed below or received, as in the figure, in a gutter 6, leading to a reservoir. (Not shown.) The water which under the electro-endosmotical action of the current wanders from the box 4 into the box 1 is continuously replaced from a water-supply 7. As the electrical resistance in the box 1 increases in proportion with the decomposition of the electrolytically-dissociable components of the material, I prefer to increase the intensity of the current correspondingly in order to expedite the electro-endosmotical action. The current is shut off as soon as a test shows the absence of sugar in the percolating liquor.

The liquor obtained in the manner described possesses an ammoniacal odor and a strong alkaline reaction and is of a greenish-brown color, owing to the presence of ammonium and sodium albuminates. The latter are precipitated from the liquor in known manner and the sugar obtained by crystallization from the filtered-off liquor, which shows to be but slightly colored. The saccharose thus obtained is perfectly free from invert-sugar.

Instead of being vertically arranged the apparatus may also be horizontally disposed, preferably with the water-box at top and the negative electrode at bottom.

What I claim, and desire to secure by Letters Patent of the United States, is—

1. The process of extracting sugar which consists in placing the saccharine material to be treated in a disintegrated and wet state between a negative electrode pervious to liquid and a body of water, placing the positive electrode into said body of water so as to separate it by a layer of water from the saccharine material, driving the electrolytically non-dissociable liquid bodies present toward the negative electrode by passing a current through the said body of water and material by means of said electrodes, collecting the liquor percolating through the negative electrode and separating therefrom sugar, substantially as and for the purpose specified.

2. The process of extracting sugar which consists in placing the saccharine material to be treated in a disintegrated and wet state between a negative electrode pervious to liquid and a body of water, placing the positive electrode into said body of water so as to separate it by a layer of water from the saccharine material, driving the electrolytically non-dissociable liquid bodies present toward the negative electrode by passing a current through the said body of water and material by means of said electrodes, increasing the intensity of the current in proportion as the electric resistance of the material increases, collecting the liquor percolating through the negative electrode and separating therefrom sugar, substantially as and for the purpose specified.

3. The process of extracting sugar which consists in placing the saccharine material to be treated in a disintegrated and wet state between a negative electrode pervious to liquid and a body of water, placing the positive electrode into said body of water so as to separate it by a layer of water from the saccharine material, driving the electrolytically non-dissociable liquid bodies present toward the negative electrode by passing a current through the said body of water and material by means of said electrodes, increasing the intensity of the current in proportion as the electric resistance of the material increases, supplying water to replace that driven into the material from the body of water surrounding the positive electrode, collecting the liquor percolating through the negative electrode and separating therefrom sugar, substantially as and for the purpose specified.

In testimony whereof I have hereunto set my hand in presence of two subscribing witnesses.

BOTHO SCHWERIN.

Witnesses:
HENRY HASPER,
WOLDEMAR HAUPT.